United States Patent [19]

Campau

[11] Patent Number: 4,708,084
[45] Date of Patent: Nov. 24, 1987

[54] SYSTEM FOR DISTRIBUTING WATER FLOW BETWEEN A RESERVOIR AND A WATER SOURCE

[76] Inventor: Daniel N. Campau, 656 Duxbury Ct., Grand Rapids, Mich. 49506

[21] Appl. No.: 831,929

[22] Filed: Feb. 20, 1986

Related U.S. Application Data

[63] Continuation-in-part of Ser. No. 629,310, Jul. 10, 1984, Pat. No. 4,589,441.

[51] Int. Cl.⁴ ............................................. B63B 35/26
[52] U.S. Cl. ........................................ 114/255; 43/57; 114/343; 137/269.5; 137/512; 137/599
[58] Field of Search ...................... 114/255; 43/55, 56, 43/57; 119/3, 5; 137/493.8, 512.1, 599, 625.32, 269.5, 512

[56] References Cited
U.S. PATENT DOCUMENTS

| | | | |
|---|---|---|---|
| 840,876 | 1/1907 | Steedman | 137/493.8 X |
| 3,565,099 | 2/1971 | Huber | 137/269.5 |
| 4,033,280 | 7/1977 | Wood et al. | 114/343 X |
| 4,074,651 | 2/1978 | Arduser | 114/255 |
| 4,184,281 | 1/1980 | Corby et al. | 43/57 |

Primary Examiner—Joseph F. Peters, Jr.
Assistant Examiner—Paul E. Salmon
Attorney, Agent, or Firm—Niro, Scavone, Haller & Niro

[57] ABSTRACT

A water distribution system for directing water flow between a live well in a fishing boat and a water source, such as a lake. The water distribution system includes a flow directing valve which has two operating conditions. In the first operating condition a plurality of check valves automatically direct the water flow to selectively keep the live well empty or to empty water from the live well. In a second operating condition the valve enables the selective filling of the live well, the maintenance of the water level in the live well and the recirculation of the water along with the input of fresh water to the live well. In the second operating condition these functions are carried out automatically without operator intervention, regardless of whether the boat is stationary or moving. A pressure differential from the pump is applied through the valve which has pipe outlets substantially equidistant from the pump port, which during recirculation and maintenance of the water enables pumping substantial amounts of water to the live well from both the live well and the water source.

25 Claims, 8 Drawing Figures

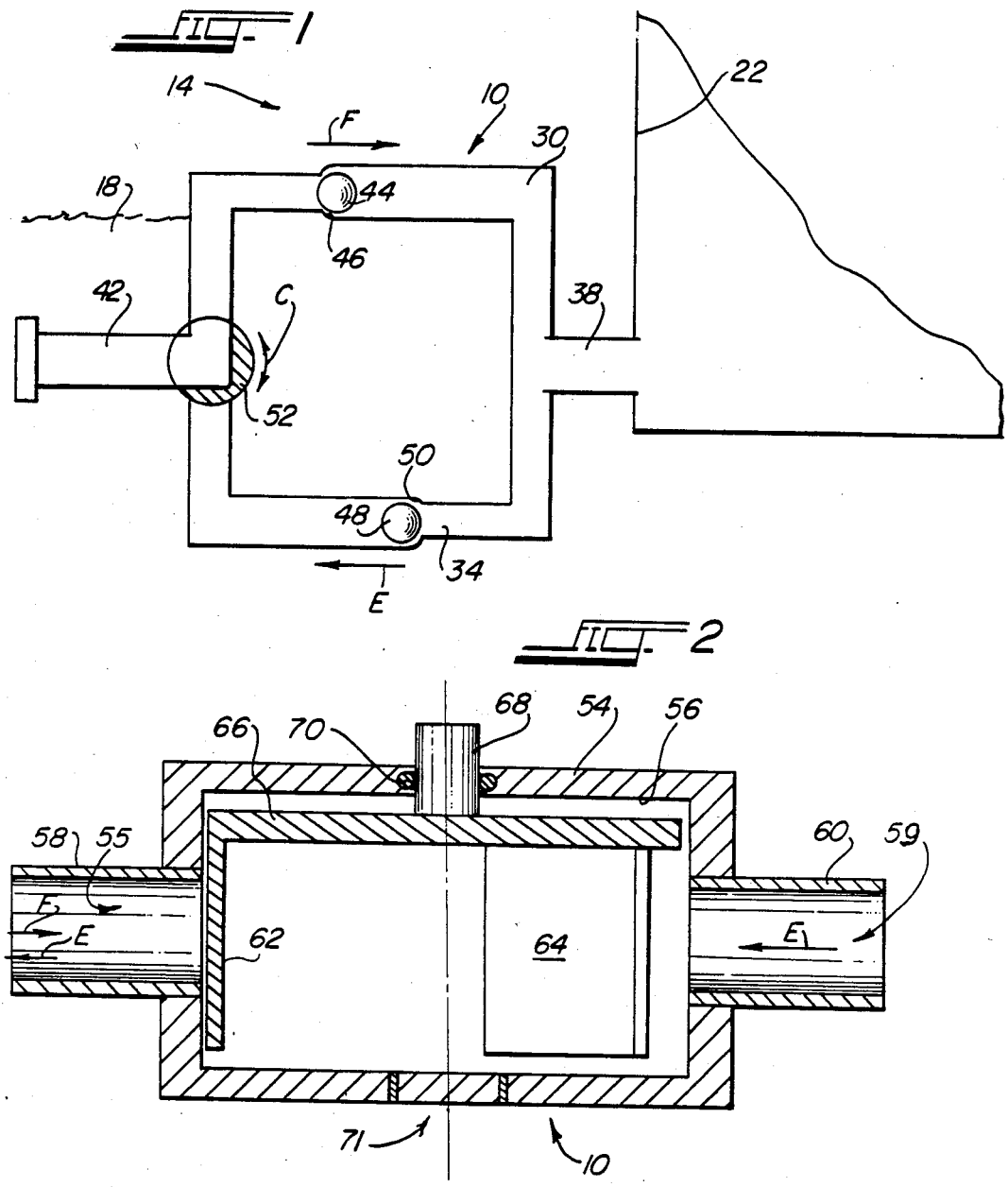

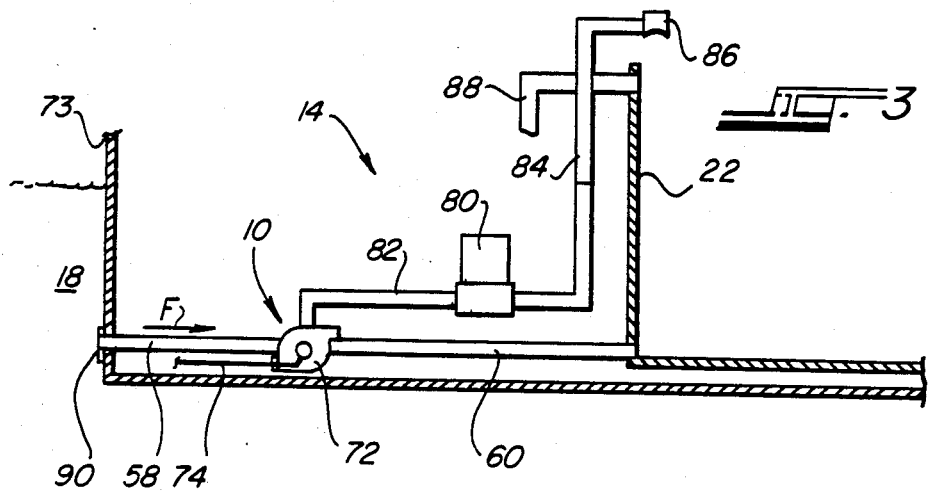
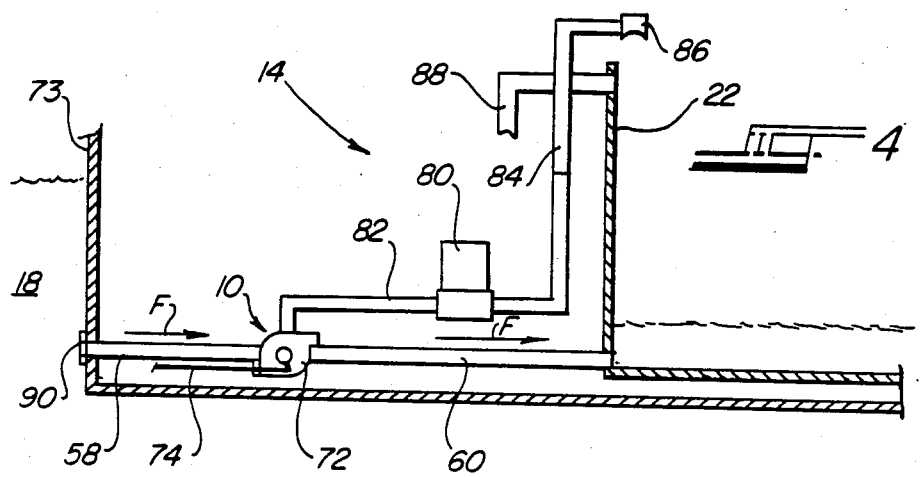
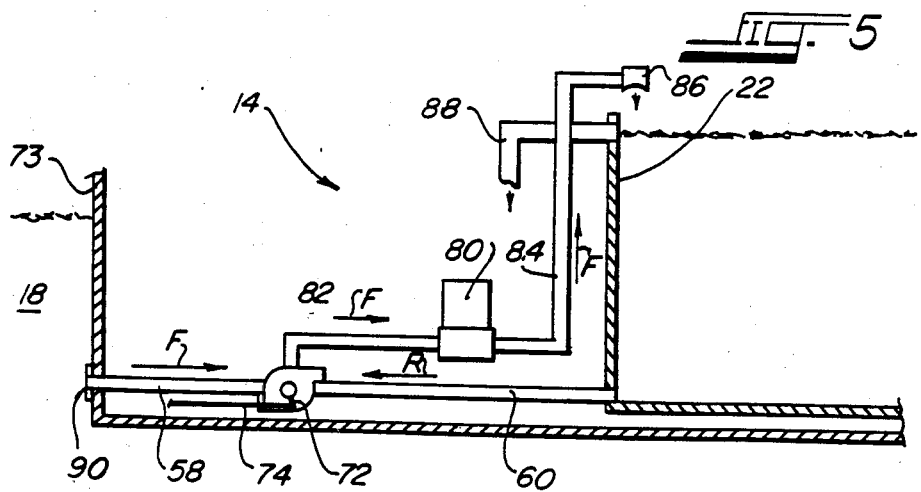

SYSTEM FOR DISTRIBUTING WATER FLOW BETWEEN A RESERVOIR AND A WATER SOURCE

REFERENCE TO RELATED APPLICATION

This application is a continuation-in-part of an application entitled, "System for Controlling Liquid Flow," having Ser. No. 629,310, filed July 10, 1984, which issued as U.S. Pat. No. 4,589,441 on May 10, 1986.

BACKGROUND OF THE INVENTION

This invention relates generally to a water distribution system for directing the flow of water between a reservoir, such as a live well on a fishing boat, and a water source, such as a lake or river.

In fishing vessels, such as bass fishing boats, live wells are provided wherein a manual valve is used to permit water to flow into the live well until the tank level is equalized with the water level of the water source. Normally, the live well is filled while the boat is stationary in the water. If an operator fails to close the manual valve when the boat moves off with any speed, the live well is drained. This can lead to the death of any fish in the live well. It is also desirable to be able readily to empty the live well, either by running the boat with the valve open or by pulling the boat out of the water and draining the live well by gravity.

Previously, the only available control means has been a valve which functions in the manner described above. Often an operator will forget to close the valve when appropriate. For example, under the pressures of competitive fishing, operators frequently fail to place the valve in the proper position, resulting in the loss of water from the live well and the death of fish contained in the live well. In many fishing tournaments this results in a serious penalty for the contestant. It would therefore be highly desirable to provide a simple water distribution system which can safely, conveniently and inexpensively control live well water filling and emptying cycles and preclude the accidental emptying of a live well when a boat is moved in the water source or is pulled out of the water.

BRIEF SUMMARY OF THE INVENTION

One of the primary objects of the invention is to provide an improved system for directing the flow of water between a reservoir, such as a live well, and a water source.

Another object of the invention is to provide a new water distribution system which is simple and inexpensive and functions to selectively fill a live well on a fishing boat from a water source and to prevent accidental draining of the live well.

A further object of the invention is to provide an improved water distribution system in which the live well is filled, and the water level maintained and recirculated without operator intervention throughout the cycles of moving the boat and keeping the boat stationary.

It is an additional object of the invention to provide a novel water distribution system for filling a live well to a level above the water source level.

It is another object to provide an improved water distribution system having an automatically primed water pump which is achieved upon positioning a boat in a water source.

It is a further object of the invention to provide a novel water distribution system including a flow directing valve coupled directly to the water pump to form an integral, highly efficient package.

A feature of the water distribution system in accordance with the invention is the provision of a flow directing valve appropriately positioned in the system with the valve directing water flow between a live well in the boat and a water source, such as a lake. The valve has two general operating conditions. In the first operating condition a plurality of check valves in the valve automatically direct the water flow to selectively keep the live well empty or to empty water from the live well. In this first operating condition the water pump is also automatically primed upon placement of the boat in the water source. In a second operating condition the valve enables the selected filling of the live well, the maintenance of the water level and the recirculation of the water in the live well along with input of fresh water. In the second operating condition these above functions are carried out automatically without the necessity of operator intervention by way of change of valve operating condition, regardless of whether the boat is stationary or moving. Another feature of the invention comprises the position of the water pump coupling into the valve with a pressure differential or suction applied through ports in the valve to any water present in the live well, as well as to water from the water source. This coupling directly through the valve enables relatively large amounts of water from both the water source and the live well to be mixed and output to the live well to provide well aerated and properly cooled water.

Further objects and advantages of the present invention, together with the organization and manner of operation thereof, will become apparent from the following detailed description of the invention when taken in conjunction with the accompanying drawings, wherein like reference numerals designate like elements throughout the several views.

BRIEF DESCRIPTION OF THE DRAWINGS

FIG. 1 is a schematic of a flow directing valve in communication with the water source and the live well;

FIG. 2 is a cross sectional drawing of one form of the flow directing valve containing two flapper type check valves;

FIG. 3 shows a starting condition for the water distribution system with the flow directing valve in a first operating condition and the boat moving or stationary in the water source and the live well empty;

FIG. 4 shows a slow fill condition for the water distribution system with the flow directing valve in a second operating condition and the boat stationary in the water source;

FIG. 5 shows a rapid fill condition for the water distribution system with the flow directing valve in a second operating condition, the pump turned on and the boat stationary in the water source;

DETAILED DESCRIPTION OF PREFERRED EMBODIMENTS

Figure 6:
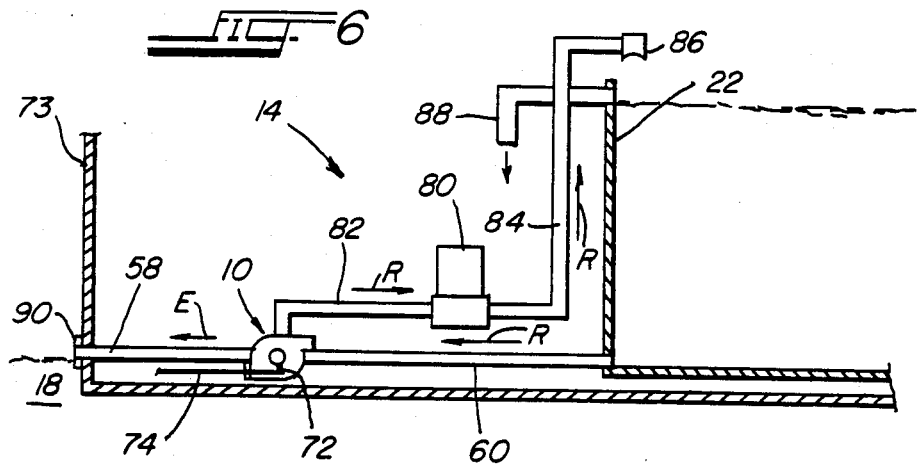
FIG. 6 shows a maintain and recirculate condition for the water distribution system with the flow directing valve in the second operating condition, the pump turned on and the boat moving in the water source.

Referring to the drawings, FIGS. 1 and 2 show the structural details of two forms of a flow directing valve 10 used in a water distribution system 14 shown in FIGS. 3-7. The invention is generally directed to a system for directing the flow of water between a water source 18, such as a lake or river, and a reservoir, such as a live well 22 on fishing vessels for keeping alive the fish caught. Typically, the live well 22 is filled with water from the water source 18 using its natural water pressure to fill the live well 22 to a pressure equalized level. A simplified first form of the flow directing valve 10 (hereinafter "valve 10") in the water distribution system 14 is shown schematically in FIG. 1. In the simplest form of the water distribution system 14 shown in FIG. 1, a plurality of pipes are provided between the live well 22 and the water source 18. The plurality of pipes include first and second pipes 30 and 34, respectively. The two pipes 30 and 34 are joined by a common pipe 38 leading to the live well 22. An access pipe 42 connects the passageways for selective communication with the water source 18.

A first check valve in the form of a ball 44 is operatively associated with a valve seat 46 and allows the water to flow through the first pipe 30 in a direction only from the water source 18 to fill the live well 22 along the flow direction indicated by arrow "F" in FIG. 1. A second check valve in the form of a second ball 48 is operatively associated with a valve seat 50 to allow the water to empty through the second pipe 34 only from the live well 22 to the water source 18 with the flow direction indicated by arrow "E".

As shown in FIG. 1, a selectively operable flow directing valve 52 is rotatably disposed at the common juncture between the first pipe 30, the second pipe 34 and the access pipe 42. The selectively operable valve 52 is shown in FIG. 1 in a first position for filling the live well 22 from the water source 18. It can be seen that the water can flow from the water source 18 under pressure through the first pipe 30 by automatically displacing the ball 44. However, the ball 44 will prevent reverse flow of the water should an operator maintain the selectively operable valve 52 in its filling position shown in FIG. 1, and when the level of the water at the water source 18 drops below the water level in the live well 22.

The selectively operable flow directing valve 52 is rotatable along the directions of double headed arrow "C" in FIG. 1 to an emptying position, establishing communication between the second pipe 34 and the access pipe 42. Should the level of the water at the water source 18 be at least as high as the level of the water in the live well 22, no flow of the water through the second pipe 34 will result. However, should the water level of the water source 18 fall relative to the water level in the live well 22, such as for example, as a result of a boat moving at high speed or by pulling the boat out of the water source 18, the water in the live well 22 will drain through the second pipe 34 as the ball 48 is displaced. The water then passes selectively through the valve 52 and out through the access pipe 42. Back flow of the water from the water source 18 is prevented by the ball 48 seating against the valve seat 50.

FIG. 2 illustrates another form of the valve 10. This valve 10 has a selectively operable valve means and automatic check valve means. The structure of the valve 10 is comprised of a unitary structure operable within a closed housing 54 defining an interior chamber 56 for directing both the flow of the water through the chamber 56 in either direction and for checking the flow of the water in the appropriate direction for a selected operating condition. The housing 54 is coupled by a first port 55 to a first pipe 58 which is in communication with the water source 18, (not shown in FIG. 2) and the housing 54 communicates through a second port 59 by a second pipe to the live well 22 (not shown in FIG. 2). A first check valve member in the form of a flexible flap 62, is coupled to the first pipe 58 to permit the flow of the water along the direction of arrow "F" in FIG. 2 through the chamber 56 only when the valve 10 is in a first, filling condition as shown in FIG. 2. The second valve member, in the form of a flexible flap 64, is coupled to the second pipe 60 to permit the emptying of water from the live well 22 along the direction of arrows "E". The water empties through the chamber 56 when the selectively operable valve 10 is in a second, draining condition. In this second draining condition, the flexible flap 62 is rotated away from the opening into the first pipe 58, and the second flexible flap 64 is positioned in front of the opening into the second pipe 60. The first and second check valve members 62 and 64, respectively, are mounted on a rotary member 66 operable through a valve shaft 68 having a seal 70. It can also be seen in FIG. 2 that the first and second check valve members 62 and 64 are disposed on the rotary member 66 less than one hundred eighty degrees apart. In this manner the second pipe 60 is totally unobstructed when the valve 10 is in the filling position shown in FIG. 2, whereas the first pipe 58 is totally unobstructed when the valve 10 is in the emptying or draining condition (not shown). Preferably, the first port 55 and the second port 59 are disposed on diametrically opposite sides of the housing 54 with a third port 71 equidistant therebetween leading to a pump. This configuration has important advantages in recirculation of water to the live well 22 and will be described in more detail hereinafter.

The operation of the water distribution system 14 as a whole is best understood by referring to FIGS. 3-7. The starting condition is shown in FIG. 3 with a boat 73 positioned in the water source 18. The live well 22 in the boat 73 is empty and the valve 10 is in a first operating condition as indicated by a control lever 72 being positioned to the left by a control coupling 74. In this first operating condition the water in the first pipe 58 in communication with the water source 18 is prevented from entering the second pipe 60, and a water pump 80 is off. However, the water is allowed to flow along the direction indicated by arrow "F" into a pump pipe 82, through the pump 80 and into a pump outlet pipe 84 until the water level therein is equilibrated with the level of the water source 18. Consequently, the pump 80 is easily primed and quickly available for pumping water. The pump 80 therefore does not experience air lock problems, which is a common problem on systems which use water cut-off valves, and does not require any extraordinary effort or procedures by the operator to prime the pump 80. In this first operating condition, the water is not pumped into the live well 22 which remains empty until the operator chooses to proceed to fill the live well 22.

In order to fill the live well 22 with water the operator places the valve 10 into the second operating condition shown in FIG. 4, wherein the control lever 72 has been moved by the operator to the right by the control coupling 74. In this second operating condition the boat 73 is stationary in the water source 18, and the water in the first pipe 58 is directed through the valve 10 along the direction of the arrow "F" into the second pipe 60 and into the live well 22 from the water source 18. With the pump 80 off the live well 22 is slowly filled with water.

In order to fill the live well 22 more rapidly in the second operating condition, the pump 80 is turned on as shown in FIG. 5. Water is then drawn by pressure suction applied by the pump 80 through the valve 10, and water is pulled into the pump pipe 82. The water is discharged by the pump 80 along the direction of arrows "F" into the pump outlet pipe 84 and passed through an aerator 86 to instill air in the water which sustains fish in the live well 22. Water also is recirculated from the live well 22 along the direction of arrow "R". Water is preferably intermittently pumped into the live well 22 to maintain the water level with any excess water passing out of the system 14 through an overflow pipe 88. When pump 80 is off, the water level in the live well 22 is maintained by chech valve means which also prevents backflow loss of water from live well 22. This mode of operation sustains a desirable level of oxygen throughout all levels of the water in the live well 22 and keeps the water temperature throughout substantially the same as the water source 18. By achieving these conditions a number of fish can be kept alive and healthy in the live well 22.

The pumping of the water directly through the valve 10 has a number of advantages which include the ability to pump relatively large quantities of water from the water source 18, along with the recirculation of water along the direction of arrow "R" in FIG. 5 from the live well 22. The pumping of the water through the valve 10 is preferably carried out by applying a pressure differential through the port 71 to the first port 55 and the second port 59 shown in FIG. 2. As mentioned herinbefore, the port 71 is positioned substantially equidistant between the first and second ports 55 and 59 in the valve 10. This arrangement provides substantial balance in the source of water pumped into the live well 22 with the relative ratio of water from the live well 22 and the water source 18 changing as the live well 22 is filled. However, even when the live well 22 is full, there is still a substantial amount of fresh water from the water source 18 being pumped into the live well 22. Further, the pumping of the water through the valve 10 also enables the water level in the live well 22 to be pumped above the water level of the water source 18.

As shown in FIG. 6 when the operator proceeds to move the boat, both the water level and water quality are still maintainable while the valve 10 is in the second operating condition. While the boat is moving, the recirculation along the direction of arrows "R" and aeration of the water continues in the manner illustrated; but with the valve 10 still in the second operating condition, the flow of water is directed, or recirculated, only from the live well 22 through the pump 80 and back to the live well 22. Since the boat 73 is in motion in the water source 18, there is a lowered water level and decreased pressure region generated adjacent a water inlet/outlet port 90 (hereinafter the "port 90"). The port 90 is disposed at the rear of the boat 73 or can be along the longitudinal sides of boat 73 and normally is positioned below the water line of a motionless boat. The lowered pressure causes removal of water along the direction of arrows "E" from the first pipe 58, but the check valve means of the valve 10, such as the flexible flap 62 shown in FIG. 2, prevents flow of water from the live well 22 into the water source 18. Therefore, in this second operating condition, once the control lever 72 is set and the pump 80 is actuated by the operator, the live well 22 is selectively filled with water, the water level is maintained and the water is recirculated to sustain oxygen content and a desirable temperature in the live well 22. The maintenance and recirculation of the water can be carried out without operator intervention, regardless of the motion or lack of motion of the boat 73. This feature is particularly advantageous when the operator is frequently changing from one position to another on a lake or river during competitive fishing. The invention thus makes unnecessary operator intervention when changing the boat 73 from a stationary state to a moving state, and avoids the possibility of loss of water from the live well 22 due to operator oversight.

Figure 7:
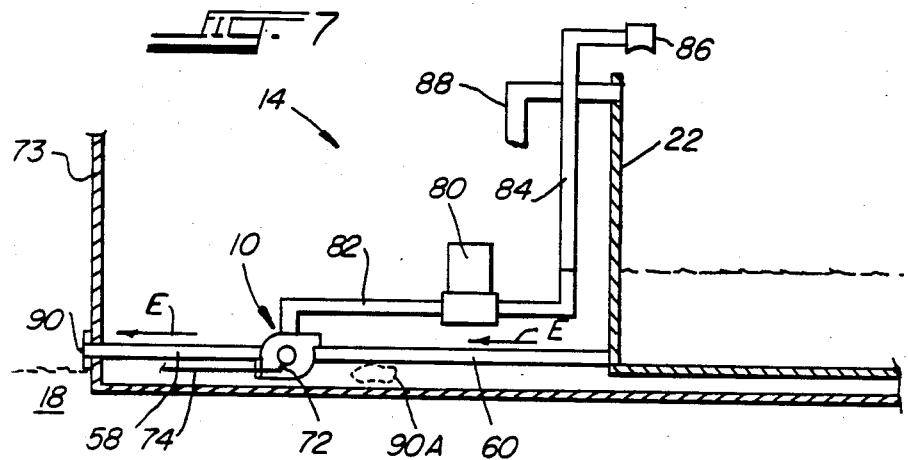
FIG. 7 shows an emptying condition for the water distribution system with the flow directing valve in the first operating condition and the boat moving in the water source.

To empty the live well 22, the operator returns the valve 10 to the first operating condition by moving the control lever 72 to the left position shown in FIG. 7. To empty the live well 22 while the boat 73 is moving in the water source 18, the pump 80 is turned off, and the low pressure generated adjacent the water inlet/outlet port 90 causes removal of the water from the live well 22 along the direction of the arrows "E". The water then flows through the second pipe 60 with the valve 10 directing water flow past the check valves and out through the first pipe 58 along the direction of the arrows "E". Once the live well 22 is emptied, the valve 10 prevents flow of water from the water source 18 in the manner described in conjunction with the first operating condition as illustrated in FIG. 3. Alternatively, the boat 73 can be removed from the water source 18 and the control lever 72 moved to the left position, permitting gravity drainage of the live well 22 with the water draining along the same path in the system 14 as described above.

The subject invention has numerous advantages over previous water distribution systems for live wells in fishing boats. The valve 10 permits filling, maintenance and recirculation of water in the live well 22. The boat operator is only required to place the valve 10 of the water distribution system 14 in the desired operating condition and no further operator intervention is required, regardless of whether the boat is stationary or moving. The position of the valve 10 in the water distribution system 14 results in substantial amounts of fresh water being drawn into the live well 22 during all states of operation, except at high speeds of boat operation where the water is nearly one hundred percent recirculated water. This enables the maintenance of proper temperature and oxygen content for the water in the live well 22 and further enables achievement of water levels in the live well 22 in excess of the water level of the external water source 18.

Figure 8:
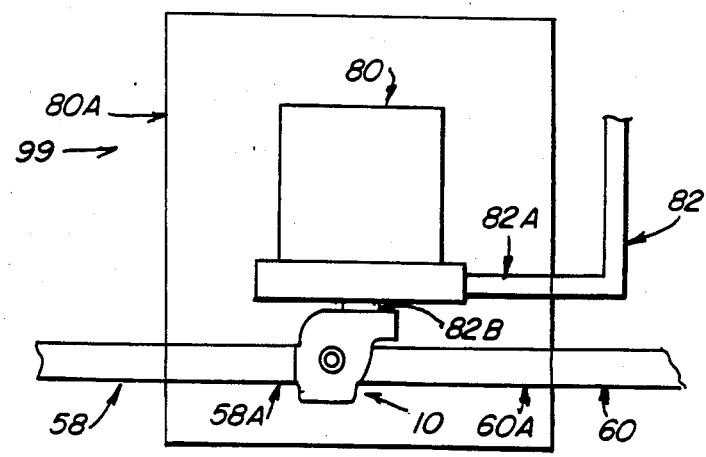
FIG. 8 shows schematically one embodiment of a pump and valve integrated into one package.

As those skilled in the art will recognize, the pump 80 and the valve 10 can be combined into an integral unit 99, such as, for example, is shown in FIG. 8. One such integral unit 99 is encased in a housing 80A which contains the pump 80, valve 10 and interior connections 58A, 60A and 82A that connect to the pipes 58, 60 and 82, respectively. The pump 80 and the valve 10 can be connected to each other by a short pipe 82B or other means, or affixed to each other directly without the housing 80A or pipe 82B shown in FIG. 8. The control lever 72 and the control 74 are not shown in FIG. 8.

While preferred embodiments of the present invention have been illustrated and described, it will be understood that changes and modifications apparent to those of ordinary skill in the art may be made therein without departing from the spirit and scope of the invention defined in the following claims.

What is claimed is:

1. A water distribution system to provide directed water flow between a water source and a live well in a boat being used in moving and stationary states in the water source, comprising:
   a water inlet/outlet port in communication with said water source;
   valve means for directing water flow between said live well and said inlet/outlet port and having first and second operating conditions in said water distribution system, said valve means including first check valve means operative when said valve means is in said first operating condition for permitting water flow through said valve means only to empty said live well or to keep empty said live well and second check valve means operative when said valve means is in said second operating condition to permit water flow through said valve means only to fill said live well, to maintain the water level in said live well or to recirculate the water through said live well throughout said moving and stationary states of said boat; and
   pump means having a pump pipe coupled to said valve means for providing a pressure differential across said valve means to fill, maintain and recirculate the water in said live well.

2. The water distribution system as defined in claim 1 wherein said pump means is coupled to said valve means with said pressure differential applied through said valve means to the water in said live well and the water input from said water resource.

3. The water distribution system as defined in claim 1 wherein said valve means includes three ports with a first port in communication with said inlet/outlet port, a second port in communication with said live well and a third port in communication with said pump means; and said pump means simultaneously providing a pressure differential across said first and third ports and said second and third ports.

4. The water distribution system as defined in claim 3 wherein said third port is positioned substantially equidistant between said first and second ports 5. The water distribution system as defined in claim 1 wherein said valve means is coupled directly to said pump means to form an integral package.

6. The water distribution system as defined in claim 1 wherein said pump means is automatically primed upon positioning said boat in said water source.

7. The water distribution system as defined in claim 1 wherein said pump means is off during said valve means first operating condition.

8. The water distribution system as defined in claim 1 wherein said pump means is off during the slow filling of said live well by the water pressure from said water source and is selectively on both during the more rapid filling of said live well and during the recirculation of the water to said live well.

9. The water distribution system as defined in claim 1 further including aereator means for providing aereated water to said live well from said pump means.

10. A water distribution system for use by an operator to provide directed water flow between a water source and a live well in a boat being used in moving and stationary states in the water source, comprising:
    a water inlet/outlet port in communication with said water source;
    valve means for directing water flow between said live well and said inlet/outlet port and having first and second operating conditions in said water distribution system, said valve means including first check valve means operative when said valve means is in said first operating condition for permitting water flow through said valve means only to empty said live well or to keep empty said live well and second check valve means operative when said valve mean is in said second operating condition to permit water flow through said valve means only to fill said live well, to maintain the water level in said live well or to recirculate the water through said live well throughout said moving and stationary states of said boat; and
    pump means coupled to said valve means said valve means having three ports with a first port in communication with said inlet/outlet port, a second port in communication with said live well and a third port in communication with said pump means; and said pump means simultaneously providing a differential pressure across said first and third ports and said second and third ports.

11. A water distribution system for use by an operator to provide directed water flow between a water source and a live well in a boat being used in moving and stationary states in the water source, comprising:
    a water inlet/outlet port in communication with said water source and positioned below the water line at the rear of said boat;
    valve means for directing the water flow between said live well and said inlet/outlet port, said valve means having a plurality of check valves adapted for directing the water flow to selectively fill, maintain and recirculate the water in said live well without the intervention of the operator throughout said moving and stationary states of said boat; and
    pump means coupled to said valve means and adapted for selectively applying a pressure differential through said valve means to the water in said live well and the water of said water resource, said pump means being selectively activated to fill, maintain or recirculate the water in said live well.

12. The water distribution system as defined in claim 11 wherein said plurality of check valves are further adapted to empty to keep said live well empty without the intervention of the operator throughout said moving and stationary states.

13. The water distribution system as defined in claim 11 further including aereator means in communication with said pump means for providing aereated water to said live well.

14. The water distribution system as defined in claim 11 wherein said pump means is automatically primed upon positioning said boat in said water source.

15. The water distribution system as defined in claim 11 wherein said valve means includes three ports with a first port in communication with said inlet/outlet port, a second port in communication with said live well and a third port in communication with said pump means; and said pump means simultaneously providing a pressure differential across said first and third ports and said second and third ports.

16. The water distribution system as defined in claim 11 wherein said valve means is coupled directly to said pump means to form an integral package.

17. A water distribution system for use by an operator to provide directed water flow between a water source and a live well in a boat being used in moving and stationary states in said water source, comprising:
a water inlet/outlet port in communication with said water source and positioned below the water line of said boat with said port having a lowered pressure region generated adjacent thereto during forward motion of said boat;
valve means for directing the water flow between said live well and said inlet/outlet port and having first and second operating conditions in said water distribution system, said valve means having a plurality of check valve means adapted in said first operating condition for directing the water flow to keep empty said live well or to emoty water from said live well and further adapted in said second operating condition to selectively fill, maintain and recirculate the water in said live well without the intervention of the operator throughout said moving and stationary states of said boat; and
pump means coupled to said valve means and adapted for providing a pressure differential to fill with water from said water source said live well, and to maintain and to recirculate the water in said live well.

18. The water distribution system as defined in claim 17 wherein said pump is automatically primed upon positioning of said boat in said water source.

19. The water distribution system as defined in claim 17 wherein said inlet/outlet port is positioned selectively along the longitudinal sides of said boat.

20. The water distribution system as defined in claim 18 further including an aereator in communication with said pump means and being adapted for providing aereated water to said live well.

21. A water distribution system for use by an operator to provide directed water flow between a water source and a live well in a boat being used in moving and stationary states in the water source, comprising:
a water inlet/outlet port in communication with said water source and positioned below the water line at the rear of said boat;
a first pipe coupled to said inlet/outlet port;
valve means coupled to said first pipe for directing the water flow between said live well and said water source, said valve means having a plurality of check valves adapted for directing the water flow to selectively fill, maintain and recirculate the water in said live well without the intervention of the operator throughout said moving and stationary states of said boat; and
pump means automatically primed upon positioning said boat in said water source and selectively activated to fill, maintain and recirculate the water in said live well.

22. The water distribution system as defined in claim 21 further including an aereator in communication with said water pump being adapted for providing aereated water to said live well.

23. The water distribution system as defined in claim 21 wherein said pump means is coupled to said valve means with said pump means applying a pressure differential to said valve mean substantially equidistant between the outlets from said valve means to said water source and said live well.

24. The water distribution system as defined in claim 21 wherein said valve means is coupled directly to said pump means to form an integral package.

25. A water distribution system in a boat used in moving and stationary states with the system used for directing the flow of water between a live well and a water source, comprising:
a water inlet/outlet port in communication with said water source;
a first pipe coupled to said inlet/outlet port;
selectively operable valve means coupled to said first pipe and having a second pipe coupling said live well to said valve means, said valve means for changing between a first filling condition for filling said live well with the water from said water source and between a second draining condition to empty the water from said live well to said water source;
check valve means for automatically preventing the flow of the water from said live well to said water source when said selectively operable valve means is in said first filling condition and for preventing the flow of the water from said water source to said live well when said selectively operable valve means is in said second draining condition, said check valve means operating in said first filling condition without the intervention of the operator of said boat throughout said moving and stationary states; and said first and second pipes further comprising a passageway through a valve housing and said selectively operable valve means and said check valve means comprising a unitary structure in said housing for controlling both the flow of the water through said housing in either direction and for checking the flow of the water in the respective opposite direction; and
said housing having a first port entering from said water source and a second port therefrom to said live well, a first check valve member operatively associated with said first port to permit the flow of the water through the housing only from said water source when said selectively operable valve means is in said first filling condition and a second check valve member operatively associated with said second port to permit the flow of the water through the housing only from said live well when said selectively operable valve means is in said second draining condition.

* * * * *